US010349480B2

(12) United States Patent
Hsieh

(10) Patent No.: US 10,349,480 B2
(45) Date of Patent: Jul. 9, 2019

(54) HYBRID GREEN-ENERGY STREET LIGHT APPARATUS

(71) Applicant: Institute of Nuclear Energy Research, Atomic Energy Council, Executive Yuan, R.O.C., Taoyuan (TW)

(72) Inventor: Chin-Lung Hsieh, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 116 days.

(21) Appl. No.: 15/789,235

(22) Filed: Oct. 20, 2017

(65) Prior Publication Data

US 2018/0376554 A1    Dec. 27, 2018

(30) Foreign Application Priority Data

Jun. 27, 2017   (TW) .............................. 106121475 A

(51) Int. Cl.

| H02J 4/00 | (2006.01) |
|---|---|
| H05B 33/08 | (2006.01) |
| H02J 7/35 | (2006.01) |
| H02J 7/34 | (2006.01) |
| H05B 37/02 | (2006.01) |
| H02J 3/38 | (2006.01) |

(52) U.S. Cl.
CPC ............ *H05B 33/0842* (2013.01); *H02J 4/00* (2013.01); *H02J 7/34* (2013.01); *H02J 7/35* (2013.01); *H05B 37/0254* (2013.01); *H02J 3/385* (2013.01); *H02J 3/386* (2013.01); *H02J 7/345* (2013.01)

(58) Field of Classification Search
CPC ... H05B 33/0842; H05B 37/0254; H02J 4/00; H02J 7/34; H02J 7/35; H02J 3/385; H02J 3/386; H02J 7/345
See application file for complete search history.

(56) References Cited

U.S. PATENT DOCUMENTS 7,976,180 B1 *   7/2011   Haun .................... F21S 8/086
                                                    362/153.1

* cited by examiner

*Primary Examiner* — Robert L Deberadinis
(74) *Attorney, Agent, or Firm* — Locke Lord LLP; Tim Tingkang Xia, Esq.

(57) ABSTRACT

A hybrid green-energy street light apparatus includes a bus cable, a load unit, a first storage unit, a second storage unit and a green-energy generator. The load unit, the first battery body and the green-energy generator connect the bus cable. The first storage unit includes a first controller and a first battery body having a first voltage. The first controller keeps a terminal voltage of the first battery body at a second voltage greater than the first voltage. The second storage unit includes a second battery body, a second controller and a first switch. The second battery body connects the bus cable through the first switch. When the terminal voltage of the first battery body drops to the second voltage, the second controller closes the first switch to couple the second battery body and the bus cable. The green-energy generator charges the first storage unit and the second storage unit.

11 Claims, 2 Drawing Sheets

HYBRID GREEN-ENERGY STREET LIGHT APPARATUS

CROSS REFERENCE TO RELATED APPLICATION

This application claims the benefit of Taiwan Patent Application Serial No. 106121475, filed Jun. 27, 2017 the subject matter of which is incorporated herein by reference.

BACKGROUND OF THE INVENTION

(1) Field of the Invention

The invention relates to a green-energy street light apparatus, and more particularly to a hybrid green-energy street light apparatus that does not need an external power source, such as a power company.

(2) Description of the Prior Art

Street lighting, or called as public lighting, consumes 20%-35% global total generating capacity. As rapid development in green-energy generation and green lighting technology, the solar street light or lamp gradually emerges as one of mainstream public or roadside lighting devices. The solar street light, generally consisted of a solar cell and an LED (Light emitting diode) lamp, can provide night lighting without a power supplies by a power company. Thereupon, it is already a worldwide trend to substitute the conventional street lights by the solar street lights.

In the art, the solar street light is usually equipped with an energy-storage battery. Since the energy-storage battery is featured in self charging/discharging and a limited ability in protecting the circuit system, thus it is vulnerable to abnormal situations or malfunctions due to frequent instability. In particular, long-term cloudy and rainy days would definitely contribute to an insufficient-charge state. Therefore, in order to resolve the aforesaid shortcoming in power deficiency, some types of solar street-lighting systems would be also connected to a municipal power grid established by a specific power company. However, in some suburban or remote areas that can't be reached by the stable municipal power grid, a necessity of acquiring an off-grid or independent solar street-light technology to improve the aforesaid power-deficiency problem is surely welcome to the art.

SUMMARY OF THE INVENTION

Accordingly, it is an object of the present invention to provide a hybrid green-energy street light apparatus that can effectively resolve the existing power-deficiency problem of the street-lighting system. In the present invention, the hybrid green-energy street light apparatus includes a bus cable, a load unit, a first storage unit, a second storage unit and a green-energy generator. The load unit is connected with the bus cable. The first storage unit includes a first battery body and a first controller, in which a cutoff voltage of the first battery body is defined as a first voltage. The first battery body is connected with the bus cable. The first controller at least keeps a terminal voltage of the first battery body at a second voltage greater than the first voltage. The second storage unit includes a second battery body, a second controller and a first switch, in which the second battery body is connected with the bus cable through the first switch. When the terminal voltage of the first battery body is decreased to the second voltage, the second controller turns the first switch into a closed state, such that the second battery body can be electrically coupled with the bus cable. The green-energy generator, connected with the bus cable, is to charge the first storage unit and the second storage unit by a green energy.

In one embodiment of the present invention, a first power converter, located between the green-energy generator and the bus cable, includes a maximum power point tracking module for having the green-energy generator to generate a maximum power output.

In one embodiment of the present invention, the cutoff voltage of the first power converter is a third voltage. When a terminal voltage of the first battery body is decreased to the third voltage, the second controller turns the first switch into the closed state, such that the second battery body can be electrically coupled with the bus cable.

In one embodiment of the present invention, the load unit includes at least one of an LED module, a lamp module, a DC socket, an AC socket and a power module.

In one embodiment of the present invention, the load unit is an LED module. The hybrid green-energy street light apparatus further includes a second switch and a third controller. The second switch is located between the load unit and the bus cable, and open or closed of the second switch is controlled by a degree of sunshine exposure and the third controller. When the second switch is in a closed state, the second controller turns the first switch into an open state, such that the second battery body can be electrically isolated from the bus cable. When the terminal voltage of the first battery body is decreased to the second voltage, the third controller turns the second switch into an open state, such that the load unit can be electrically isolated from the bus cable.

In one embodiment of the present invention, a second power converter, located between the load unit and the bus cable, includes a transformer or a DC/AC power converter.

In one embodiment of the present invention, the first battery body is a lithium battery or a lead-acid battery.

In one embodiment of the present invention, the second battery body is a flow battery or a super-capacitor.

In one embodiment of the present invention, the green-energy generator is a solar panel or a wind-driven generator.

All these objects are achieved by the hybrid green-energy street light apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
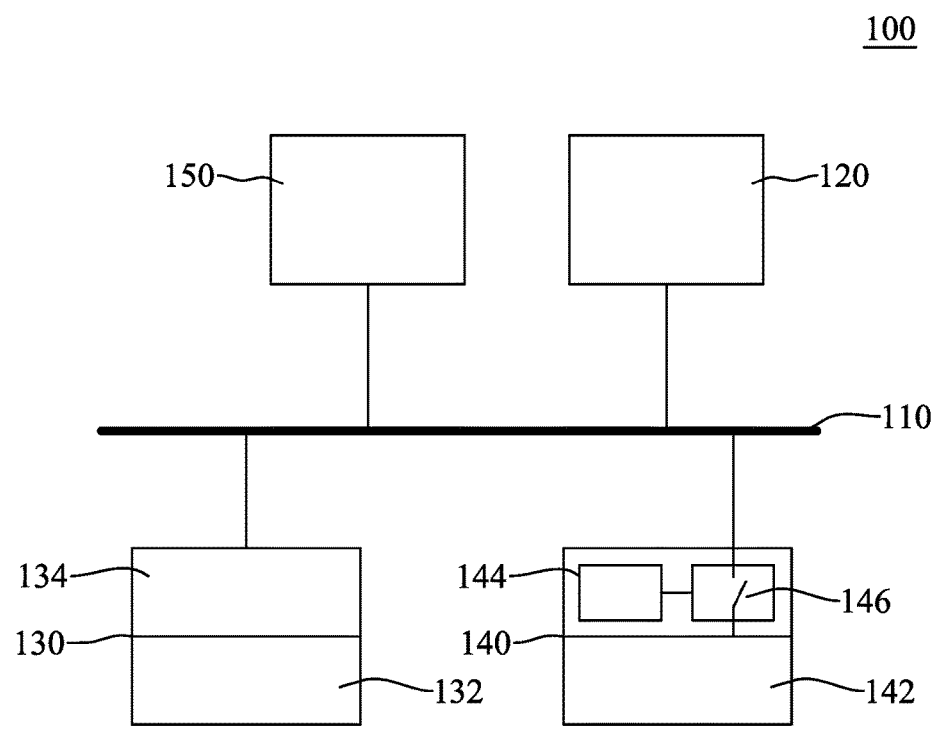
FIG. 1 is a block view of an embodiment of the hybrid green-energy street light apparatus in accordance with the present invention.

The invention disclosed herein is directed to a hybrid green-energy street light apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the following descriptions upon the embodiments of the present invention, when a specific element is depicted to be located above or below another element, it implies that this specific element is located directly or indirectly on top or under the another element. In particular, the term indirectly implies that some other elements may be located between this specific element and the another element. On the other hand, the term directly implies that no other element is involved between this specific element and the another element. Here, the position descriptions of above or below are basically referred, but not limited, to the accompanying figures. Also, the terms first, second and third are applied to different elements, but not used to limit the elements. To explain clearly, thicknesses and other dimensions of elements in the drawings are not precisely depicted, but presented only for a purpose of concise explanations upon the embodiments.

Referring now to FIG. 1, a block view of an embodiment of the hybrid green-energy street light apparatus 100 in accordance with the present invention is shown. The hybrid green-energy street light apparatus 100 includes a bus cable 110, a load unit 120, a first storage unit 130, a second storage unit 140 and a green-energy generator 150. The load unit 120, the first storage unit 130, the second storage unit 140 and the green-energy generator 150 are directly connected to the bus cable 110, which serves as a common cable of the apparatus so as to form a quasi linear-bus pattern in network topology. For a normal green or green-energy load system, the bus cable 110 flows a direct current (DC), and thus the terminology for involving this bus cable 110 is called as a DC bus.

In this present invention, the hybrid green-energy street light is introduced to be the major embodiment. The source of the green-energy generator 150 can be a natural energy, a green energy, a renewable energy or any the like. For example, the green-energy generator 150 can be a solar panel for converting the solar energy into the electric energy, or a wind-driven generator for converting the wind power into the electric energy. Since the supply of the natural energy is up to the climate, the weather, the surroundings and so on, so the natural energy is usually attributed as an unstable energy source. Hence, the green-energy power system is usually equipped with an energy-storage device, or simply called as a storage device, to improve the energy conversion efficiency and the power supply stability. In this embodiment, the green-energy generator 150 is to supply electricity to the load unit 120, and also to charge the first storage unit 130 and the second storage unit 140.

The first storage unit 130 is a rechargeable battery or a secondary battery equipped with the green-energy power system, such as a lithium battery, a lead-acid battery or the like battery with a higher electric current density. Due to limited rechargeable capacity, the lithium battery is generally built in with a high-low voltage protection circuit, and the lead-acid battery is usually equipped with an additional high-low voltage protection circuit, in which the high-low voltage protection circuit is to avoid excessive charging or discharging that could damage the battery or cause unexpected hazards. For example, as a terminal voltage of one aforesaid battery (a voltage between a positive electrode and a negative electrode) is increased or decreased to a preset upper or lower voltage limit, respectively, the aforesaid high-low voltage protection circuit would respond to disconnect the aforesaid battery from the power system. If the aforesaid battery is disconnected due to too low the terminal voltage, the stored electricity and the open-circuit voltage of the battery would decay due to a self-discharge effect. At this time, if the battery is required to resume its connection with the power system, then another power source is needed to provide at least a power sufficient to restart the aforesaid high-low voltage protection circuit, so as further to connect the disconnected battery back to the power system in a parallel or serial manner. In this embodiment, the first storage unit 130 includes a first battery body 132 and a first controller 134, in which the first battery body 132 has a rated lower bound of operating voltage (i.e. the cutoff voltage; below which the terminal voltage of the first battery body 132 is, the battery can't work normally) defined as a first voltage. As shown, the first battery body 132 is connected with the bus cable 110 through the first controller 134. The first controller 134 is to keep the terminal voltage of the first battery body 132 at least at a second voltage greater than the first voltage, such that the first battery body 132 can be prevented from a cutoff state. While in a normal state, the first storage unit 130 can provide electricity to the load unit 120 through the bus cable 110 at one end, and is charged simultaneously by the green-energy generator 150 at another end. However, when the operating voltage of the first storage unit 150 or the terminal voltage of the first battery body 132 is dropped to the first voltage, then the first battery body 132 would be electrically isolated from the bus cable 110, and thus would be cut off from the power system, such that excessive discharge at the first battery body 132 caused by continuous discharging can be avoided.

As described above, when the first battery body 132 enters the cutoff state due to a low terminal voltage, another power source is necessary to provide the demanded voltage sufficient for restarting the first controller 134, such that the first battery body 132 can reconnect the bus cable 110 so as to be parallel with the power system. Conventionally, the municipal power grid established by the power company usually serves as the aforesaid another power source. However, since the present invention is mainly targeted to provide an off-grid and independent green-energy street light, thus no power source other than those in the embodiment shown in FIG. 1 is needed. For example, the municipal electricity provided by the power company is one of the popular another power sources. In the present invention, the second storage unit 140 can serve the aforesaid another power source to connect in parallel with the first battery body 132 to further couple the power system and to maintain normal operation of the power system. Thereupon, power shortage caused by having merely a single storage unit (i.e. the first storage unit 130) can be amended. As shown, in this embodiment, the second storage unit 140 includes a second battery body 142, a second controller 144 and a first switch 146. The second battery body 142 is connected to the bus cable 110 through the first switch 146. The second controller 144 is to control open or closed of the first switch 146. A user can preset the aforesaid second voltage to be greater than the cutoff voltage of the first battery body 132 (i.e. the first voltage). While the hybrid green-energy street light apparatus 100 starts to work, the second storage unit 140 does not provide electricity to the load unit 120 at an early stage. As soon as the terminal voltage of the first battery body 132 is decreased to the aforesaid second voltage, the second controller 144 would turn on the first switch 146 to enter a closed state, such that the second battery body 142 and the bus cable 110 would be electrically coupled so as to connect the power system in a parallel manner. At this time, the green-energy generator 150 can charge the first storage unit 130 and the second storage unit 140 simultaneously, and also both the first storage unit 130 and the second storage unit 140 can provide electricity to the the load unit 120 at the same time. For example, to the first battery body 132 having a rated voltage of 12Volt (V) and the cutoff voltage of 10.5V (i.e. the first voltage of 10.5V), the second voltage can be set to be ranged from 10.5V to 12V.

In order to have the second storage unit 140 to perform specific functions as described above, the second battery body 142 can be a flow battery or a super-capacitor. The flow battery can include a positive electrolyte liquid, a negative electrolyte liquid and a battery stack. A swinging machine or a pump can be used to drive and flow the electrolyte liquids into the battery stack for carrying out an electrochemical reaction to generate charging and/or discharging. The super-capacitor is an electric double-layer capacitor with a high energy density, and is applicable to an energy-storing operation that requires rapid charging/discharging. The second battery body 142 is featured in low internal resistance and ability of frequent and in-depth charging/discharging. In addition, even at an over-discharge state, the aforesaid flow battery can still provide sufficient voltage to have the second controller 144 to turn on the first switch 146, so that the second battery body 142 can connect the power system in a parallel manner. By having a solar panel to be the green-energy generator 150 as a typical example, the solar panel can still generate weak currents to charge the flow battery, even at cloudy and rainy days. Namely, even in the rainy season, the flow battery can be still able to prevent the terminal voltage of the first battery body 132 from being too small. In addition, as long as the sunshine volume can be sufficiently provided again, the solar panel would resume normal charging of the first battery body 132 immediately, without any help from a foreign power, such as, but not limited to, the municipal electricity provided by the power company. The second battery body 142 can also be a rechargeable secondary battery that can serve various functions of the aforesaid flow battery.

Figure 2:
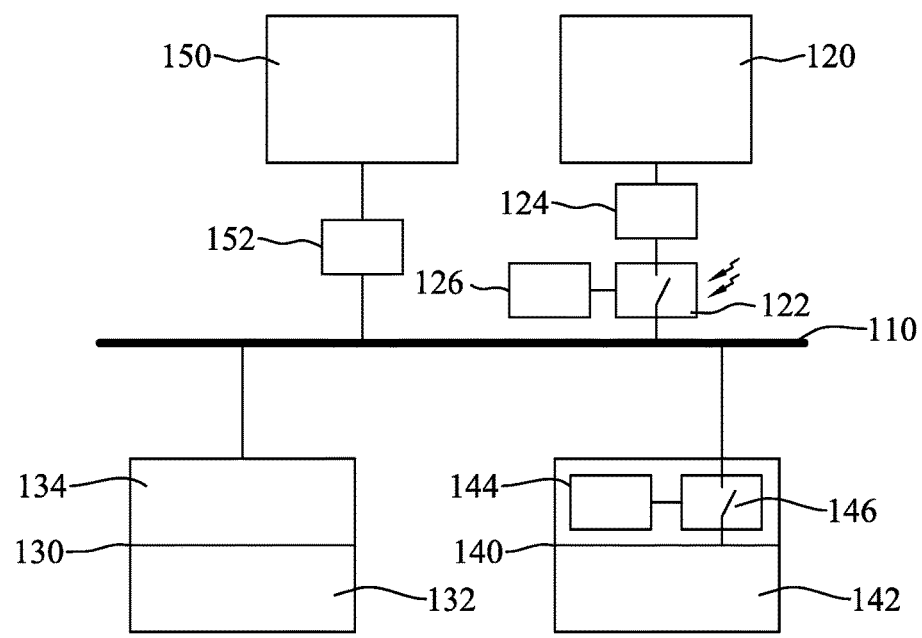
FIG. 2 is a block view of another embodiment of the hybrid green-energy street light apparatus in accordance with the present invention.

This instant invention is applicable to lighting devices, communication equipments, monitoring equipments, mobile power banks, or other loading devices such as LED modules, lamp modules, DC/AC sockets, power modules, and so on. In this embodiment, the hybrid green-energy street light is taken as a typical example, and the load unit 120 is embodied as an LED module. Since the street light is only turned on while in night or a poor-sunshine situation, thus an optical switch 122 can be introduced to be mounted between the load unit 120 and the bus cable 110. As shown in FIG. 2, a further embodiment of the hybrid green-energy street light in accordance with thee the present invention is shown. In this embodiment, on/off of the optical switch 122 to determine whether or not it is the time to operate the load unit 120 is controlled by a degree of sunshine exposure. While the optical switch 122 is turned to a closed state, the second controller 144 would turn the first switch 146 into an open state, such that the second battery body 142 can be electrically isolated from the bus cable 110. In addition, on/off or closed/open of the optical switch 122 is controlled by a third controller 126. When the terminal voltage of the first battery body 132 is decreased to the second voltage, the third controller 126 would turn the optical switch 122 into the open state, such that the load unit 120 can be electrically isolated from the bus cable 110. Further, since the bus cable 110 flows direct currents, different to the ordinary LED modules that flow alternating currents, thus a power converter 124 (such as, but not limited to, a DC/AC inverter) should be mounted between the load unit 120 and the bus cable 110, such that the direct currents in the bus cable 110 can be converted into the alternating currents for the usage in the corresponding LED modules. In the present invention, the power converter 124 can be also embodied as a transformer or any power converter the like.

In addition, if this embodiment of the green-energy generator 150 is a solar panel or a wind-driven generator, then the power converter 152 shall be included between the green-energy generator 150 and the bus cable 110, as shown in FIG. 2. The power converter 152 can transform or adjust voltage and/or current generated by the green-energy generator 150, for meeting specific electric specs of the bus cable 110. The power converter 152 can be also embodied as a maximum power point tracking (MPPT) module to have the green-energy generator 150 to generate the maximum power output. However, in order to run the power converter 152 normally, the voltage transmitted by the bus cable 110 must be at least the cutoff voltage of the power converter 152 (defined as a third voltage), which is greater than the first voltage. Similarly, when the terminal voltage of the first battery body 132 is decreased to the third voltage, the second controller 144 would turn the first switch 146 into a closed state, such that the second battery body 142 can be electrically coupled with the bus cable 110.

While the present invention has been particularly shown and described with reference to a preferred embodiment, it will be understood by those skilled in the art that various changes in form and detail may be without departing from the spirit and scope of the present invention.

What is claimed is:

1. A hybrid green-energy street light apparatus, comprising:
    a bus cable;
    a load unit, connected with the bus cable;
    a first storage unit, including a first battery body and a first controller, the first battery body having a cutoff voltage defined as a first voltage, the first battery body being connected with the bus cable, the first controller at least keeping a terminal voltage of the first battery body at a second voltage greater than the first voltage;
    a second storage unit, including a second battery body, a second controller and a first switch, the second battery body being connected with the bus cable through the first switch; wherein, when the terminal voltage of the first battery body is decreased to the second voltage, the second controller turns the first switch into a closed state, such that the second battery body is electrically coupled with the bus cable; and
    a green-energy generator, connected with the bus cable, being to charge the first storage unit and the second storage unit by a green energy.

2. The hybrid green-energy street light apparatus of claim 1, further including a first power converter located between the green-energy generator and the bus cable, the first power converter having a maximum power point tracking module for having the green-energy generator to generate a maximum power output.

3. The hybrid green-energy street light apparatus of claim 2, wherein the cutoff voltage of the first power converter is a third voltage; wherein, when the terminal voltage of the first battery body is decreased to the third voltage, the second controller turns the first switch into the closed state, such that the second battery body is electrically coupled with the bus cable.

4. The hybrid green-energy street light apparatus of claim 1, wherein the load unit includes at least one of an LED module, a lamp module, a DC socket, an AC socket and a power module.

5. The hybrid green-energy street light apparatus of claim 4, wherein the load unit is an LED module, the green-energy street light apparatus further including a second switch and a third controller, the second switch being located between the load unit and the bus cable, open or closed of the second switch being controlled by a degree of sunshine exposure and the third controller; wherein, when the second switch is in a closed state, the second controller turns the first switch into an open state, such that the second battery body is electrically isolated from the bus cable; wherein, when the terminal voltage of the first battery body is decreased to the second voltage, the third controller turns the second switch into an open state, such that the load unit is electrically isolated from the bus cable.

6. The hybrid green-energy street light apparatus of claim 1, further including a second power converter located between the load unit and the bus cable, the second power converter having one of a transformer and a DC/AC power converter.

7. The hybrid green-energy street light apparatus of claim 1, wherein the first battery body includes a secondary battery.

8. The hybrid green-energy street light apparatus of claim 1, wherein the first battery body is one of a lithium battery and a lead-acid battery.

9. The hybrid green-energy street light apparatus of claim 1, wherein the second battery body includes a secondary battery.

10. The hybrid green-energy street light apparatus of claim 1, wherein the second battery body is one of a flow battery and a super-capacitor.

11. The hybrid green-energy street light apparatus of claim 1, wherein the green-energy generator is one of a solar panel and a wind-driven generator.

* * * * *